(12) United States Patent
Tomohara

(10) Patent No.: US 9,362,847 B2
(45) Date of Patent: Jun. 7, 2016

(54) CIRCUIT DEVICE AND ELECTRONIC DEVICE

(71) Applicant: SEIKO EPSON CORPORATION, Tokyo (JP)

(72) Inventor: Kiyohide Tomohara, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/503,933

(22) Filed: Oct. 1, 2014

(65) Prior Publication Data

US 2015/0097599 A1    Apr. 9, 2015

(30) Foreign Application Priority Data

Oct. 4, 2013   (JP) ................. 2013-208887

(51) Int. Cl.
| | |
|---|---|
| *H02M 7/53* | (2006.01) |
| *H02M 7/5387* | (2007.01) |
| *H02M 1/38* | (2007.01) |
| *H02P 7/29* | (2016.01) |

(52) U.S. Cl.
CPC .............. *H02M 7/5387* (2013.01); *H02M 1/38* (2013.01); *H02P 7/29* (2013.01)

(58) Field of Classification Search
CPC ....... H02M 1/00; H02M 1/38; H02M 7/5387; H02P 6/085; H03K 3/012

USPC ................... 327/108, 109, 423, 424
See application file for complete search history.

(56) References Cited

U.S. PATENT DOCUMENTS

| | | | |
|---|---|---|---|
| 7,477,082 B2 | 1/2009 | Fukazawa | |
| 2004/0207637 A1* | 10/2004 | Pauly ................. | G01R 31/2846 345/619 |
| 2008/0284209 A1 | 11/2008 | Fukazawa | |
| 2010/0066287 A1* | 3/2010 | Street ........................ | H02P 6/18 318/400.34 |
| 2012/0007637 A1* | 1/2012 | Fukuda ............... | H02M 3/1588 327/110 |

FOREIGN PATENT DOCUMENTS

| | | |
|---|---|---|
| EP | 0 986 167 A2 | 3/2000 |
| JP | A-2000-82946 | 3/2000 |
| JP | A-2008-289143 | 11/2008 |

* cited by examiner

*Primary Examiner* — John Poos
(74) *Attorney, Agent, or Firm* — Oliff PLC

(57) ABSTRACT

The invention provides a motor driver including pre-drivers for a bridge circuit, delay circuits, and a delay setting register, wherein in order to suppress short-circuit current caused at the time of signal switching in the bridge circuit, the delay circuits are set based on delay time information in the delay setting register so as to control signals input into the pre-drivers. The signals input into the individual pre-drivers are delayed differently by the delay circuits based on the delay time information in the delay setting register, thereby preventing a short-circuit current flow caused by an offset in the timing of the individual pre-drivers being turned on and off.

6 Claims, 13 Drawing Sheets

(Comparative Example)

CIRCUIT DEVICE AND ELECTRONIC DEVICE

BACKGROUND

1. Technical Field

The present invention relates to a circuit device, an electronic device, and the like.

2. Related Art

With a bridge circuit that drives an external circuit by turning transistors on and off, the timing of switching between on and off varies slightly from transistor to transistor when the transistors are switched between on and off during a transition period between a charge period and a decay period. If a period during which a high-side transistor and a low-side transistor are simultaneously turned on occurs due to the variation in timing, through current flows via the transistors that have been turned on simultaneously.

In order to avoid such through current, JP-A-2008-289143 discloses a method in which a dead time is provided during which all transistors in a bridge circuit are turned off. The document also discloses a method for reducing switching noise during the dead time by monitoring the driving signals of the transistors and controlling, based on the result of monitoring, the bridge circuit so as to maintain either one of two low-side transistors in an on state.

The above-described bridge circuit is facing the need to achieve optimal dead time. In the case where the bridge circuit is used in, for example, a motor driver apparatus, the optimal dead time varies according to the characteristics of the motor to be driven, and thus with the dead time being fixed, it may not be able to avoid through current depending on the type of motor. Also, the required dead time differs due to variations of motor driver apparatuses during the manufacturing process, and it is therefore desirable to optimize the dead time accordingly.

SUMMARY

An advantage of some aspects of the invention is to provide a circuit device, an electronic device, and the like that can adjust the dead time to be optimal.

An aspect of the invention relates to a circuit device including: a bridge circuit including first to n-th transistors (where n is a natural number of 2 or greater); a control circuit that outputs first to n-th driving pulse signals for controlling the first to n-th transistors between on and off; first to n-th delay circuits that delay the first to n-th driving pulse signals; first to n-th pre-drivers that drive the first to n-th transistors based on the delayed first to n-th driving pulse signals; and a delay setting register in which first to n-th delay time information are variably set, wherein the first to n-th delay circuits delay the first to n-th driving pulse signals used to turn the first to n-th transistors from off to on by first to n-th delay times corresponding to the first to n-th delay time information.

According to this aspect of the invention, the first to n-th delay time information are variably set in the delay setting register, and the first to n-th driving pulse signals used to turn the first to n-th transistors of the bridge circuit from off to on are delayed by the first to n-th delay times corresponding to the first to n-th delay time information. With this configuration, it is possible to adjust the dead time to be optimal.

Also, according to an aspect of the invention, a configuration is possible in which a first transistor among the first to n-th transistors is a high-side P-type transistor, a second transistor among the first to n-th transistors is a low-side N-type transistor whose drain node is connected to a drain node of the high-side P-type transistor, and in the delay setting register, the first delay time information and the second delay time information are set such that the second delay time used to turn the low-side N-type transistor from off to on is longer than the first delay time used to turn the high-side P-type transistor from off to on.

With this configuration, it is possible to, when the bridge circuit includes a high-side P-type transistor and a low-side N-type transistor, set an appropriate first delay time and second delay time. In other words, the first delay time and the second delay time can be independently set by the delay setting register, and thus the minimum required dead time that can avoid through current can be achieved in the bridge circuit having the above-described configuration.

Also, according to an aspect of the invention, a configuration is possible in which a third transistor among the first to n-th transistors is a second high-side P-type transistor, a fourth transistor among the first to n-th transistors is a second low-side N-type transistor whose drain node is connected to a drain of the second high-side P-type transistor, and in the delay setting register, the third delay time information and the fourth delay time information are set such that the fourth delay time used to turn the second low-side N-type transistor from off to on is longer than the third delay time used to turn the second high-side P-type transistor from off to on.

With this configuration, it is possible to, when the bridge circuit includes a second high-side P-type transistor and a second low-side N-type transistor, set an appropriate third delay time and fourth delay time. In other words, the third delay time and the fourth delay time can be independently set by the delay setting register, and thus the minimum required dead time that can avoid through current can be achieved in the bridge circuit having the above-described configuration.

Also, according to an aspect of the invention, a configuration is possible in which in the delay setting register, first to n-th numbers of clocks are set as the first to n-th delay time information, and the first to n-th delay circuits delay the first to n-th driving pulse signals used to turn the first to n-th transistors from off to on by the first to n-th numbers of clocks.

With this configuration, the first to n-th delay times can be defined by the number of clocks. Accordingly, the first to n-th delay times can be consistently set, and the minimum dead time can be accurately set. Also, the configuration simply allows the signals to be delayed by the corresponding numbers of clocks, and it is therefore possible to simplify the configuration of the delay circuits.

Also, according to an aspect of the invention, a configuration is possible in which an i-th delay circuit (where i is a natural number less than or equal to n) among the first to n-th delay circuits includes: cascade-connected first to k-th flip-flop circuits that output first to k-th delayed pulse signals that are obtained by delaying an i-th driving pulse signal among the first to n-th driving pulse signals by one to k clocks (where k is a natural number greater than or equal to 2), respectively; a selector that selects, from among the first to k-th delayed pulse signals, a delayed pulse signal corresponding to i-th delay time information among the first to n-th delay time information; and a logic circuit that outputs an edge of the delayed pulse signal selected by the selector as an edge used to turn an i-th transistor among the first to n-th transistors from off to on.

With this configuration, it is possible to implement the i-th delay circuit that delays the i-th driving pulse signal used to turn the i-th transistor from off to on, by the i-th number of clocks. In other words, any one of the first to k-th delayed pulse signals can be selected according to the i-th number of clocks independently by the i-th delay circuit by using the selector. Then, the falling edge of the selected delayed pulse signal can be reflected in the driving pulse signals by the OR circuit.

Also, according to an aspect of the invention, a configuration is possible in which first and second transistors among the first to n-th transistors are high-side P-type transistors, third and fourth transistors among the first to n-th transistors are low-side N-type transistors, first and second pre-drivers among the first to n-th pre-drivers are level shifters that output input signals by using a non-inverse logic, and third and fourth pre-drivers among the first to n-th pre-drivers are level shifters that output input signals by using an inverse logic.

With this configuration, the first to n-th driving pulse signals can be uniformly set to be low active, and thus the first to n-th delay circuits can have the same circuit configuration. This enables simplification of the design of, for example, the first to n-th delay circuits.

Another aspect of the invention relates to an electronic device that includes any one of the circuit devices described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

The following is a detailed description of a preferred embodiment of the invention. Note that the embodiment described below is not intended to unduly limit the content of the invention recited in the claims, and all of the constituent elements described in the embodiment are not necessarily essential as solutions provided by the invention.

1. Configuration Example

Figure 1:
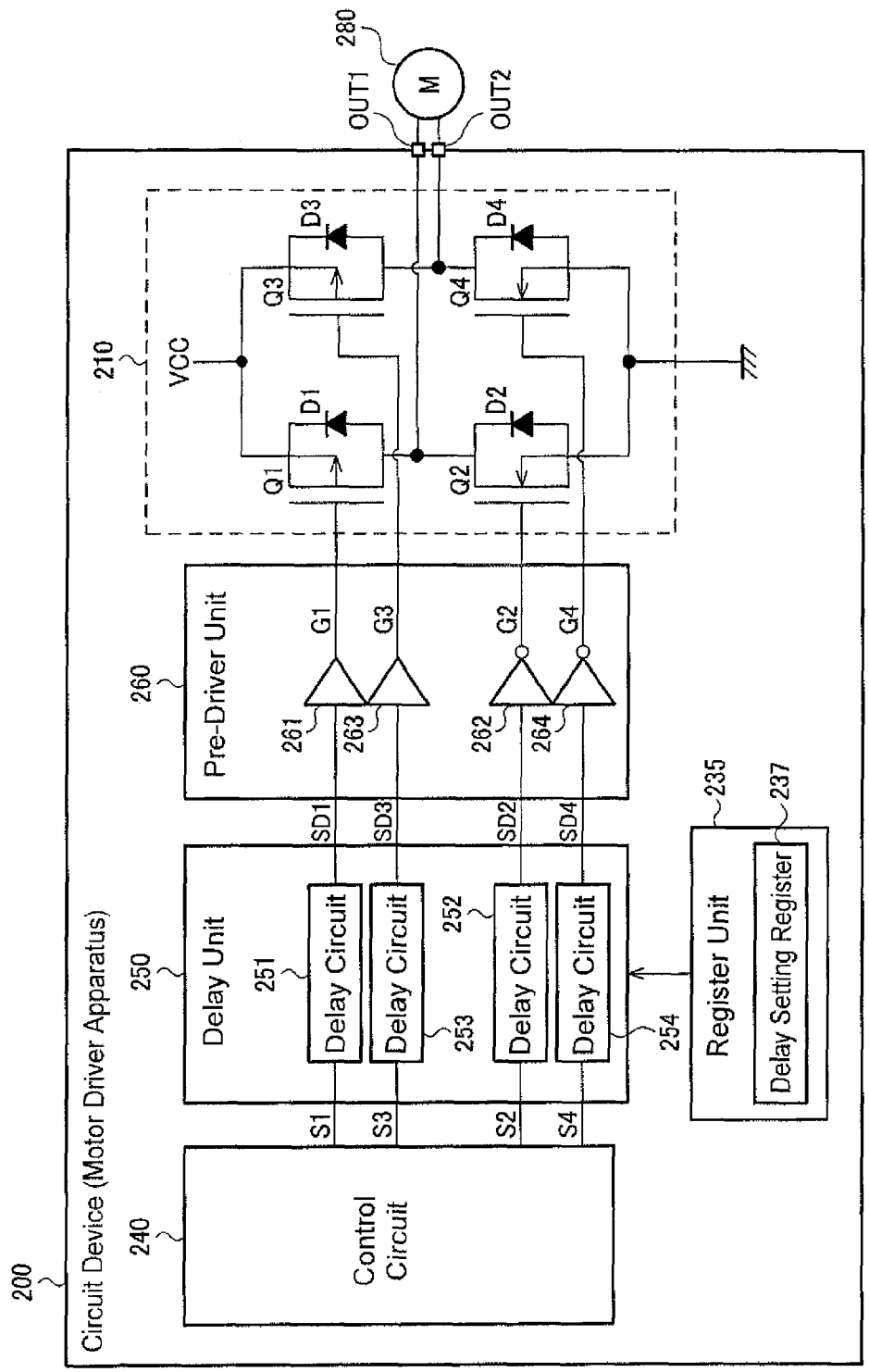
FIG. 1 shows an example of a configuration of a circuit device.

FIG. 1 shows an example of a configuration of a circuit device. A circuit device 200 includes a bridge circuit 210, a register unit 235, a control circuit 240, a delay unit 250, and a pre-driver unit 260. Hereinafter, an example will be described in which the circuit device 200 is used in a motor driver apparatus, but the circuit device 200 of the present embodiment is applicable to any apparatus that drives an external circuit by using the bridge circuit 210.

The bridge circuit 210 is a circuit that outputs driving current to a motor 280 (direct current motor) via terminals OUT1 and OUT2. To be specific, the bridge circuit 210 includes first to fourth transistors Q1 to Q4 configured as an H bridge, and diodes D1 to D4 that are respectively connected in parallel to the transistors Q1 to Q4. The transistors Q1 and Q3 have source nodes connected to a node of power supply voltage VCC, and the transistors Q2 and Q4 have source nodes connected to a node of ground voltage. The transistors Q1 and Q2 have drain nodes connected to the terminal OUT1, and the transistors Q3 and Q4 have drain nodes connected to the terminal OUT2.

Figure 2A:
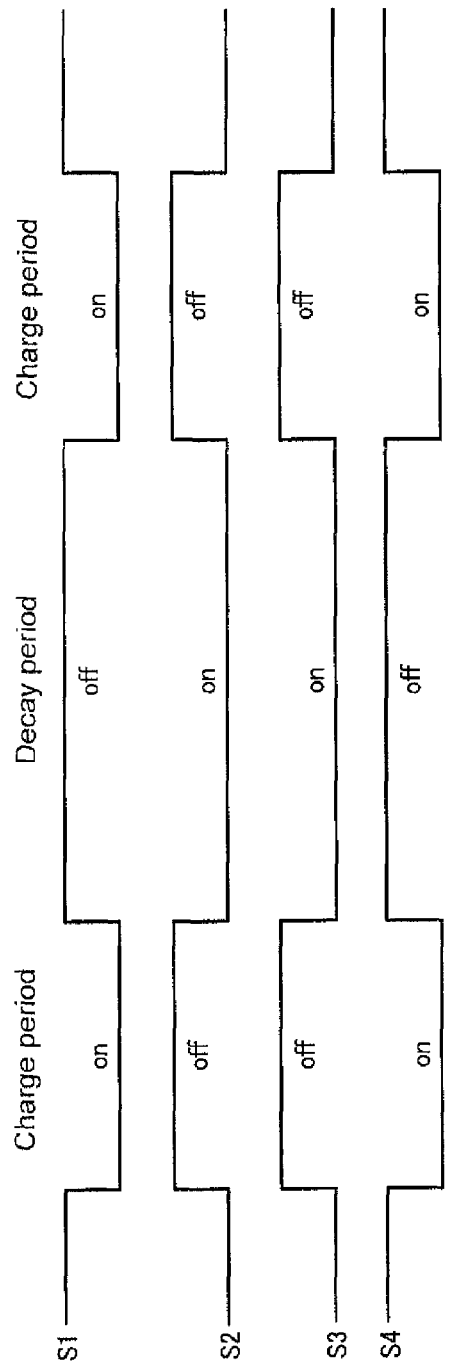
FIG. 2A shows examples of waveforms of first to fourth driving pulse signals.

The control circuit 240 is a circuit that controls the transistors Q1 to Q4 between on and off, and outputs first to fourth driving pulse signals S1 to S4 for controlling the transistors between on and off. FIG. 2A shows examples of waveforms of the driving pulse signals S1 to S4.

Figure 3:
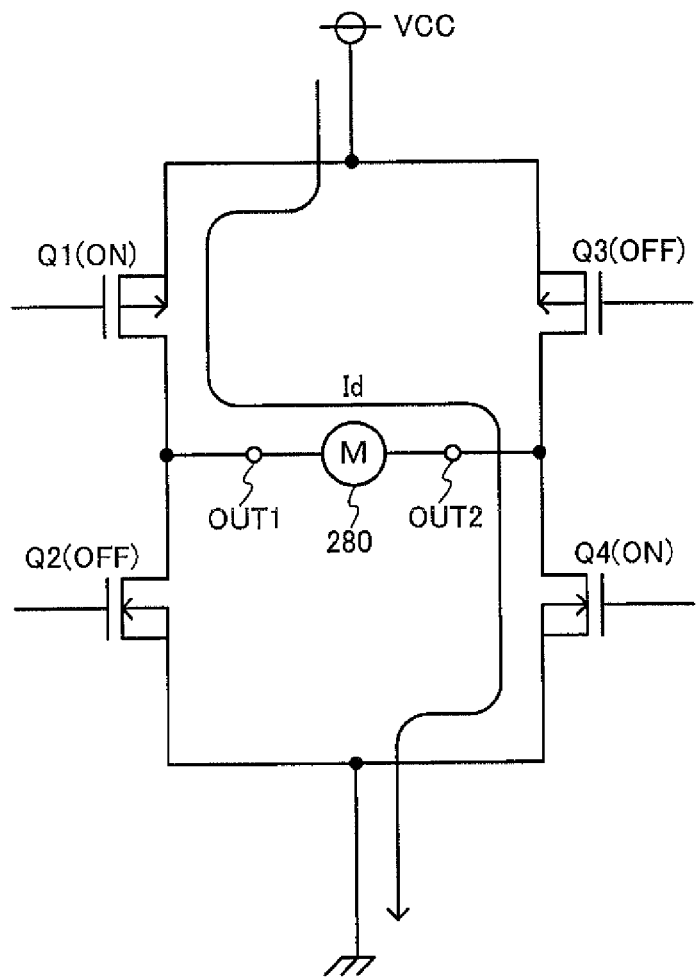
FIG. 3 is a diagram illustrating an operation performed during a charge period.
Figure 4:
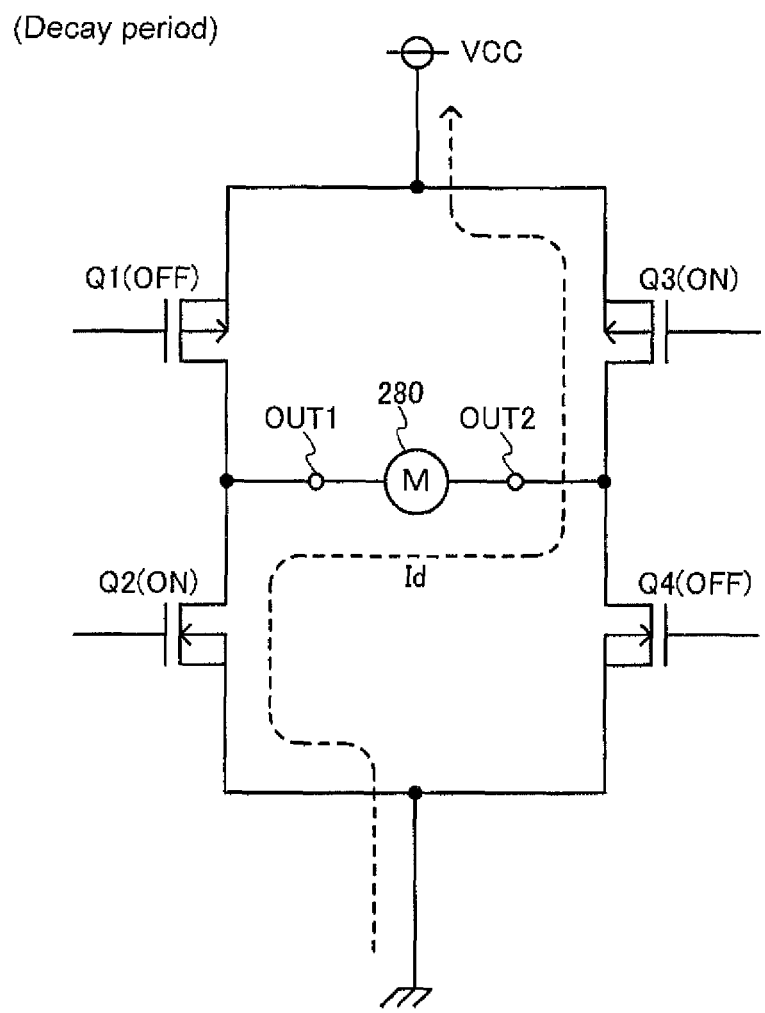
FIG. 4 is a diagram illustrating an operation performed during a decay period.

In this example, the driving pulse signals S1 to S4 are low active signals. In other words, during a charge period, the driving pulse signals S1 and S4 are at a low level, and the driving pulse signals S2 and S3 are at a high level. During the charge period, as shown in FIG. 3, the transistors Q1 and Q4 are turned on, and the transistors Q2 and Q3 are turned off, causing driving current Id to flow from the power supply to the ground. On the other hand, during a decay period, the driving pulse signals S1 and S4 are at a high level, and the driving pulse signals S2 and S3 are at a low level. During this period, as shown in FIG. 4, the transistors Q1 and Q4 are turned off, and the transistors Q2 and Q3 are turned on, causing the driving current Id to flow from the ground back to the power supply.

Figure 12:
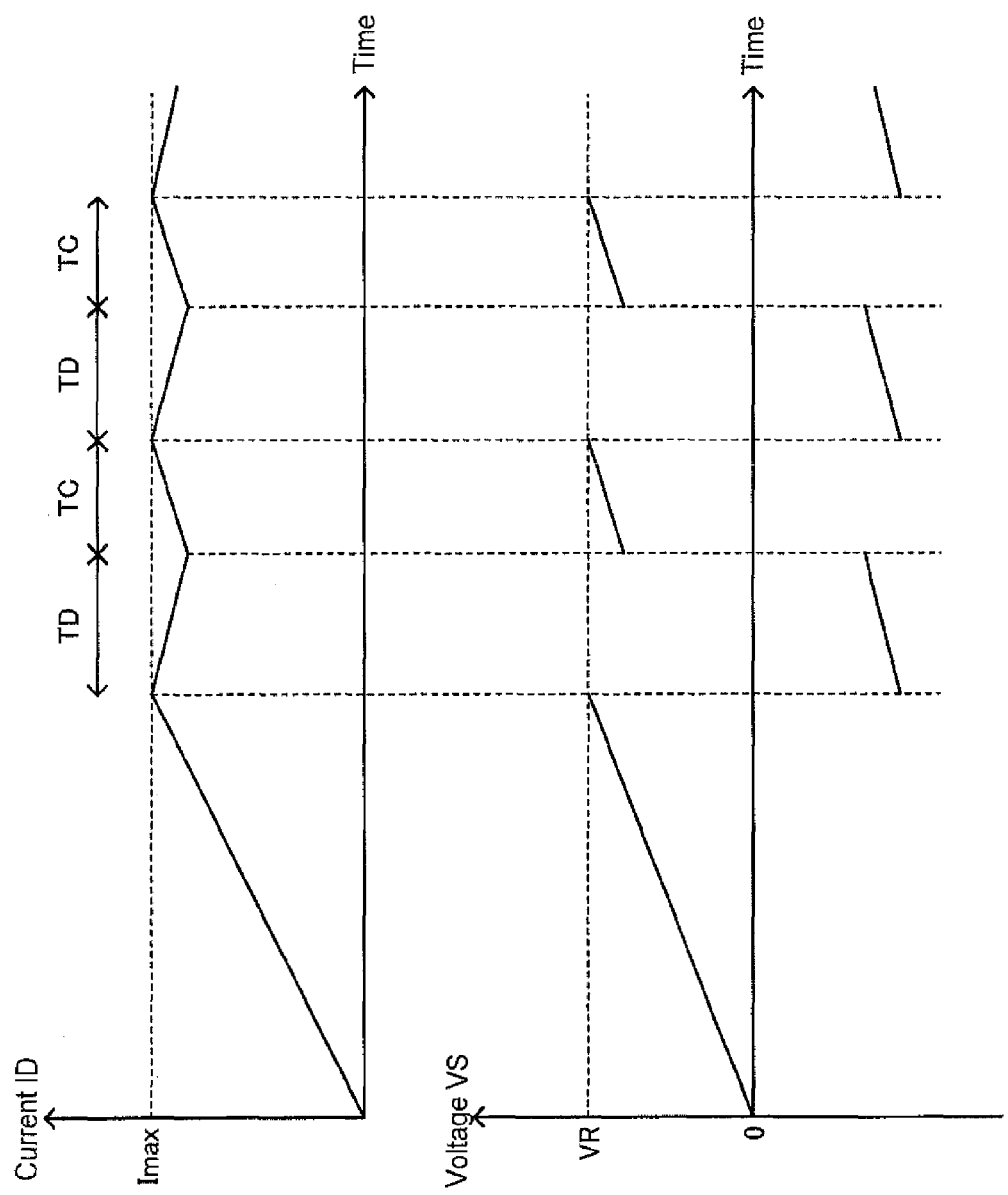
FIG. 12 is a diagram illustrating an operation performed by the circuit device according to the detailed configuration example.

As will be described later with reference to FIG. 12, the driving current Id of the motor 280 increases during the charge period and decreases during the decay period. The control circuit 240 repeats these periods, and controls the driving current Id (i.e., the number of revolutions of the motor) by controlling the length of the periods.

The delay unit 250 includes first to fourth delay circuits 251 to 254 that delay the driving pulse signals S1 to S4. To be specific, the register unit 235 includes a delay setting register 237 in which first to fourth delay time information are variably set. The delay circuits 251 to 254 respectively delay the driving pulse signals S1 to S4 based on the first to fourth delay time information, and outputs delayed driving pulse signals SD1 to SD4. The first to fourth delay time information may be any type of information as long as they are information regarding delay time. For example, in an embodiment that will be described later, a delay is caused by using a clock, and the number of clocks by which the delay is caused may be defined as the delay time information. Alternatively, the delay time information may be a delay time itself, information obtained by encoding the delay time, or the like.

The pre-driver unit 260 includes first to fourth pre-drivers 261 to 264 that drive the first to fourth transistors Q1 to Q4. The pre-drivers 261 to 264 buffer the delayed driving pulse signals SD1 to SD4, and output the buffered signals to the gates of the transistors Q1 to Q4 as driving signals G1 to G4.

A comparative example will now be described using a circuit device 200 that does not include the delay unit 250. In this comparative example, the driving pulse signals S1 to S4 output from the control circuit 240 are buffered directly by the pre-drivers 261 to 264, and then output as driving signals G1 to G4. As shown in FIG. 2A, the driving pulse signals S1 to S4 have the same timing of switching between on and off. If these driving pulse signals are applied to the transistors Q1 to Q4 while maintaining the ideal timing, then, as shown in FIGS. 3 and 4, the transistors Q1 and Q2 (or Q3 and Q4) that are connected in series are turned on and off in a mutually exclusive manner. In this case, the through current flowing from the power supply voltage VCC to the ground voltage via the transistors Q1 and Q2 (or Q3 and Q4) does not occur.

However, the actual timing of switching between on and off of the transistors Q1 to Q4 is different from the timing of switching between on and off of the driving pulse signals S1 to S4 depending on, for example, the drive capability of the pre-drivers 261 to 264, the gate size of the transistors Q1 to Q4, the characteristics of the motor 280 serving as a load, and the like.

FIG. 23 shows examples of waveforms of the driving signals G1 to G4 according to the comparative example. In this example, the driving signals G1 and G3 that drive the high-side transistors Q1 and Q3 and the driving signals G2 and G4 that drive the low-side transistors Q2 and Q4 have different edge slopes (rising time and falling time). The edge slopes cause the timing of switching between on and off to be delayed, which causes a timing difference between the high-side transistors and the low-side transistors. As a result, a period TT occurs during which the transistors Q1 and Q2 (or Q3 and Q4) are simultaneously on. During the period TT, the power supply and the ground are short circuited, and thus through current is generated.

Figure 5:
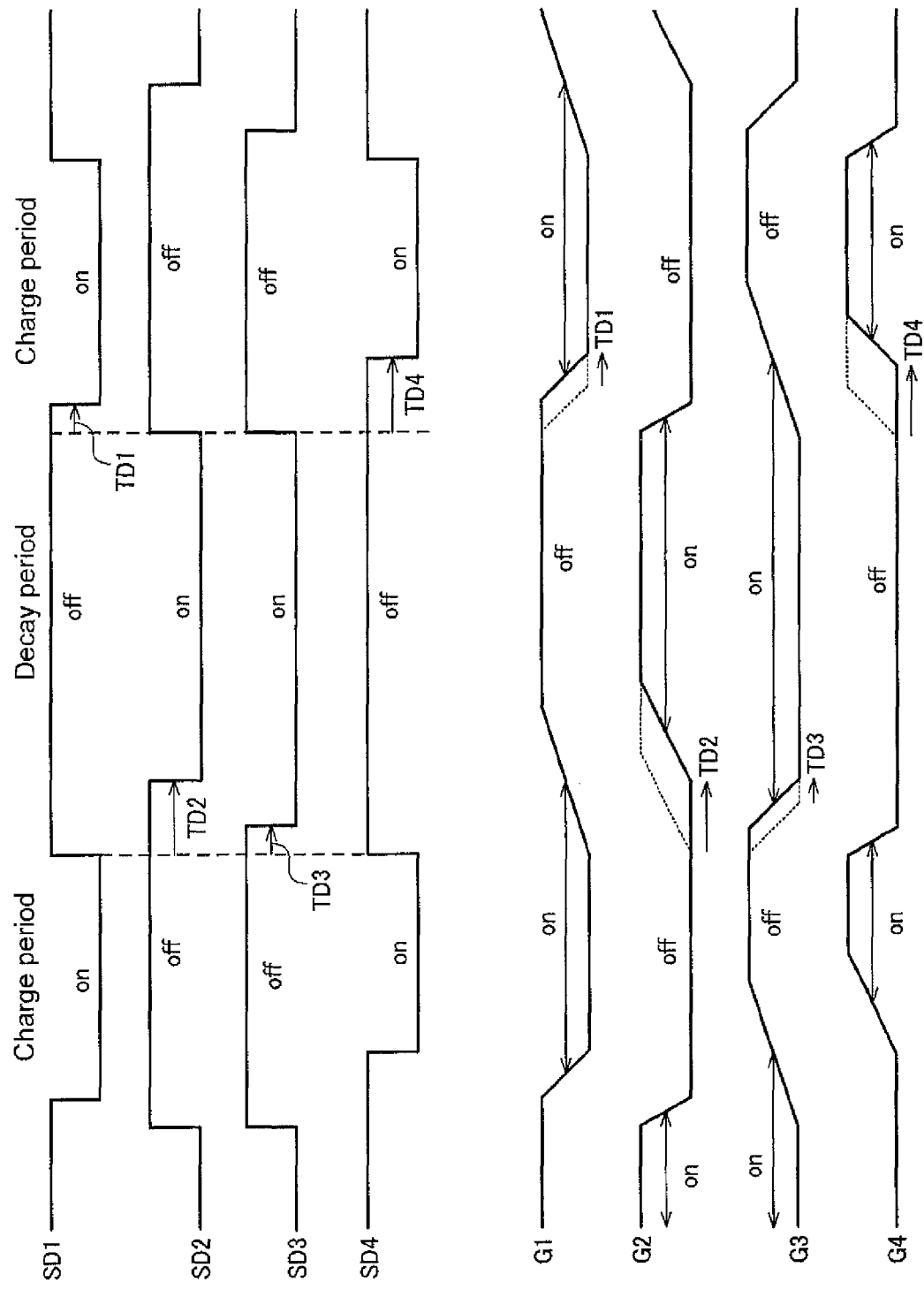
FIG. 5 shows examples of waveforms of delayed first to fourth driving pulse signals and first to fourth driving signal according to an embodiment of the invention.

To address this, in the present embodiment, the delay circuits 251 to 254 delay the driving pulse signals S1 to S4 by first to fourth delay times TD1 to TD4 corresponding to the first to fourth delay time information set in the delay setting register 237. FIG. 5 shows examples of waveforms of driving pulse signals SD1 to SD4 that are output by the delay circuits 251 to 254, and examples of waveforms of driving signals G1 to G4 that are output by the pre-drivers 261 to 264 based on the driving pulse signals SD1 to SD4.

As shown in FIG. 5, the delay circuits 251 to 254 delay the driving pulse signals S1 to S4 used to turn the transistors Q1 to Q4 from off to on by the delay times TD1 to TD4. In the case of low active driving signals, falling edges at which the driving pulse signals drop from a high level to a low level are delayed. In other words, during transition from the charge period to the decay period, the falling edges of the driving pulse signals SD2 and SD3 are delayed with respect to the rising edges of the driving pulse signals SD1 and SD4. On the other hand, during transition from the decay period to the charge period, the falling edges of the driving pulse signals SD1 and SD4 are delayed with respect to the rising edges of the driving pulse signals SD2 and SD3.

Figure 2B:
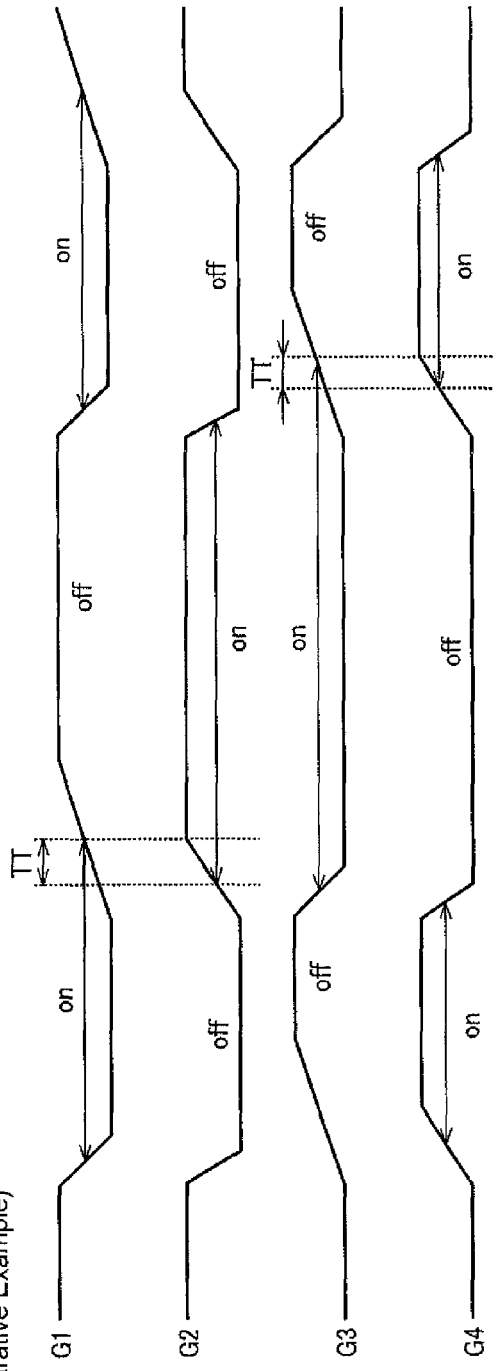
FIG. 2B shows examples of waveforms of first to fourth driving signals according to a comparative example.

Due to the delay of the driving pulse signals SD1 to SD4, the timing of when, for example, the transistor Q2 is turned from off to on is delayed by the delay time TD2. By causing a delay in the timing of turning the transistor Q2 from off to on in this way, it is possible to turn on the transistor Q2 after the transistor Q1 has been turned off. In other words, a period is generated during which the transistors Q1 and Q2 connected in series are simultaneously turned off, and it is thereby possible to eliminate the period TT during which the transistors Q1 and Q2 are turned on simultaneously, which was described with reference to FIG. 2B, and avoid through current.

Figure 6:
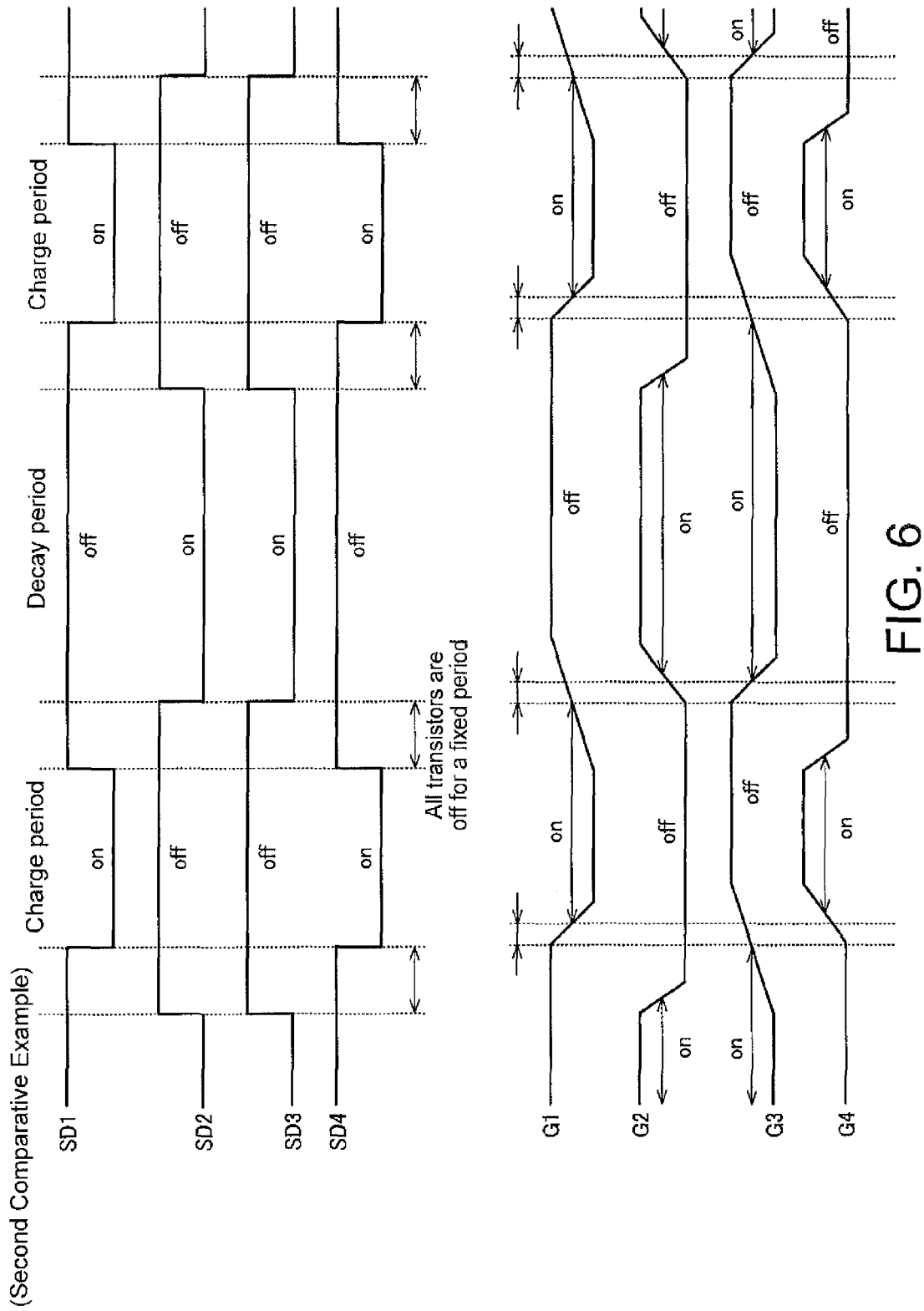
FIG. 6 shows examples of waveforms of delayed first to fourth driving pulse signals and first to fourth driving signal according to a second comparative example.

Next, a second comparative example will be described in which a fixed period is provided during which all of the transistors Q1 to Q4 are turned off. FIG. 6 shows examples of waveforms according to the second comparative example. The driving pulse signals SD1 to SD4 are provided with a fixed period during which all of them are set to high levels. Due to the fixed period, with the driving signals G1 to G4, a period occurs during which the transistors Q1 to Q4 are all turned off.

The actual timing of switching between on and off of the transistors Q1 to Q4 differs according to various factors described above. It is therefore necessary to set the fixed period during which all of the driving pulse signals SD1 to SD4 are set to high levels in consideration of the worst case caused by the timing difference. Accordingly, a problem arises in that the period during which all of the transistors Q1 to Q4 are turned off increases to reduce the period during which they are turned on, resulting in, for example, reduction of power efficiency, torque reduction of the motor 280, and the like.

According to JP-A-2008-289143 mentioned above, the timing of switching between on and off of the transistors is controlled based on the result obtained by monitoring the driving signals, and thus the dead time is not fixed. However, because the timing of switching between on and off of the transistors cannot be set freely, the dead time cannot be optimized.

In contrast, according to the present embodiment, the delay times TD1 to TD4 corresponding to the transistors Q1 to Q4 can be independently adjusted by the delay setting register 237. For example, a configuration is possible in which the circuit device 200 and the motor 280 are combined at the time of manufacturing, minimum delay times TD1 to TD4 that do not generate through current are measured, and delay time information corresponding to the minimum delay times TD1 to TD4 are set in the delay setting register 237. This operation may be performed by the user.

With this configuration, the minimum required delay times TD1 to TD4 can be set, and thus the optimal dead time is set, and the reduction of power efficiency, the torque reduction of the motor 280, and the like can be suppressed. It is basically sufficient to not simultaneously turn on the transistors Q1 and Q2 (or Q3 and Q4) that are connected in series, and it is therefore unnecessary to simultaneously turn off all of the transistors Q1 to Q4. In the present embodiment, for example, the delay times TD2 and TD3 of the driving signals G2 and G3 shown in FIG. 5 can be individually adjusted, and thus the relationship between the transistors Q1 and Q2, and the relationship between the transistors Q3 and Q4 can be individually adjusted. In other words, because the present embodiment does not have a requirement that all of the transistors are turned off simultaneously, the dead time can be reduced as much as possible to increase the time period during which the transistors are turned on.

In the embodiment given above, an example was described in which the bridge circuit 210 is constituted by the first to fourth transistors Q1 to Q4 (H bridge), but it is sufficient that the bridge circuit 210 is constituted by first to n-th transistors (where n is 2 or greater). For example, the bridge circuit 210 may be constituted by a half bridge. In this case, for example, the bridge circuit 210 is constituted by the transistors Q1 and Q2, and the terminal OUT2 is connected to the ground voltage.

2. Method for Setting Delay Time

Next is a description of a method for setting the delay times TD1 to TD4 in the bridge circuit 210 having a specific configuration.

In the bridge circuit 210 according to the configuration example shown in FIG. 1, the high-side transistors Q1 and Q3 are P-type transistors, and the low-side transistors Q2 and Q4 are N-type transistors. As used herein, the high-side transistors refer to transistors that are connected to a higher potential power supply side than the low-side transistors, and the low-side transistors refer to transistors that are connected to a lower potential power supply side than the high-side transistors.

The bridge circuit 210 is operated by high power supply voltage VCC (for example, 42 V). On the other hand, the control circuit 240 and the delay unit 250 are operated by low power supply voltage (for example, 5 V). Accordingly, the pre-drivers 261 to 264 are constituted by level shifters that convert the signal levels of the driving pulse signals SD1 to SD4. Because the high-side transistors are P-type transistors, and the low-side transistors are N-type transistors, the pre-drivers 261 and 263 output input signals (SD1 and SD3) by using a non-inverse logic, and the pre-drivers 262 and 264 output input signals (SD2 and SD4) by using an inverse logic.

With the configuration described above, as shown in FIG. 5, it is possible to supply low active driving signals G1 and G3 to the P-type transistors Q1 and Q3, and high active driving signals G2 and G4 to the N-type transistors Q2 and Q4. At the same time, the driving pulse signals SD1 to SD4 are uniformly set to be low active, and thus the delay circuits 251 to 254 can have the same circuit configuration. This enables simplification of the design of, for example, the delay circuits 251 to 254. The configuration of the delay circuits 251 to 254 will be described later in detail.

As shown in FIG. 5, in the delay setting register 237, first delay time information and second delay time information are set such that the second delay time TD2 used to turn the low-side N-type transistor Q2 from off to on is longer than the first delay time TD1 used to turn the high-side P-type transistor Q1 from off to on (i.e., TD2>TD1).

Figure 7A:
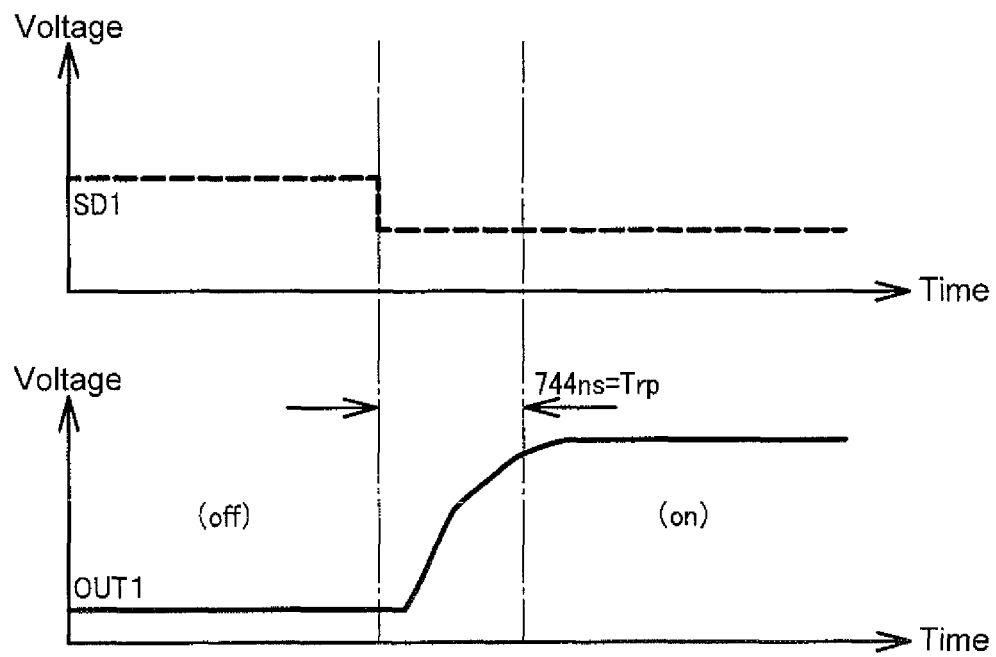
FIG. 7A shows examples of waveforms in a high-side P-type transistor.
Figure 7B:
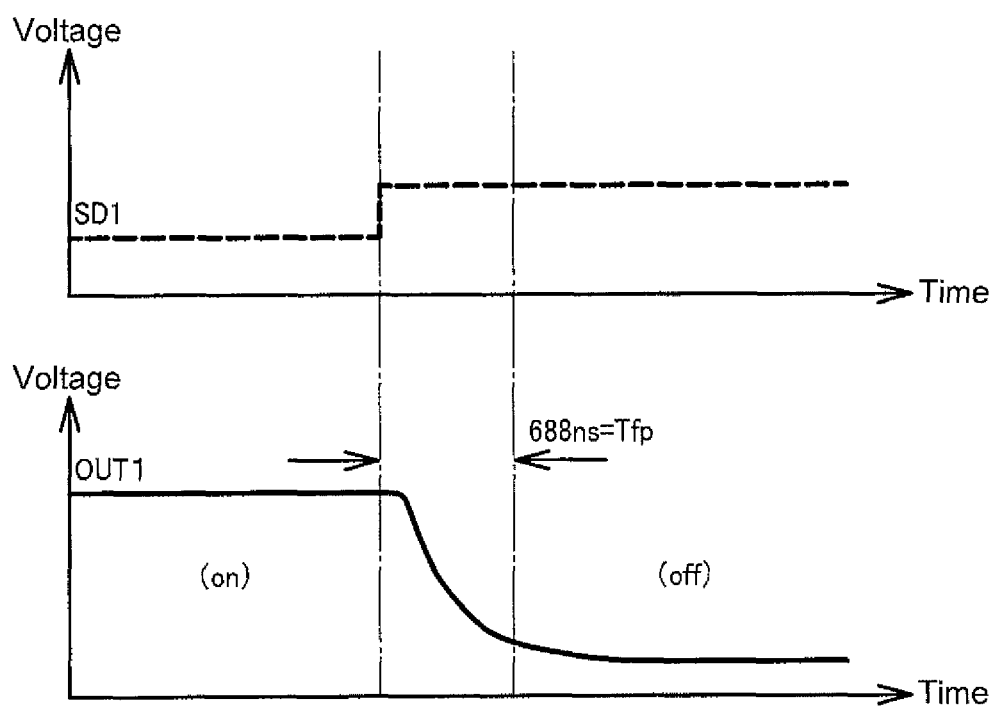
FIG. 7B shows examples of waveforms in the high-side P-type transistor.
Figure 8A:
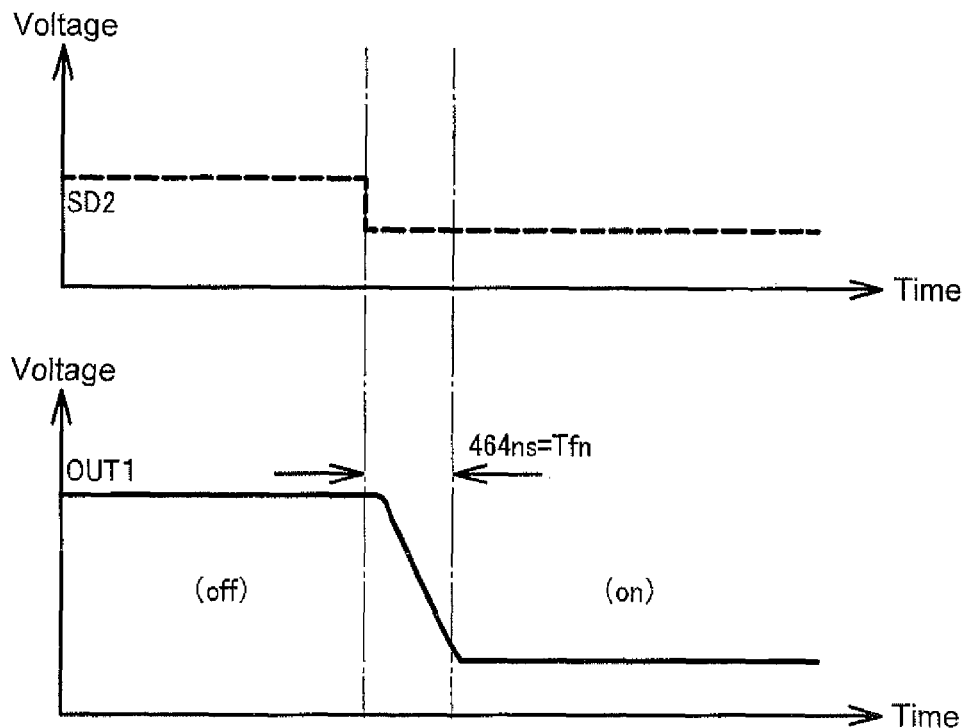
FIG. 8A shows examples of waveforms in a low-side N-type transistor.
Figure 8B:
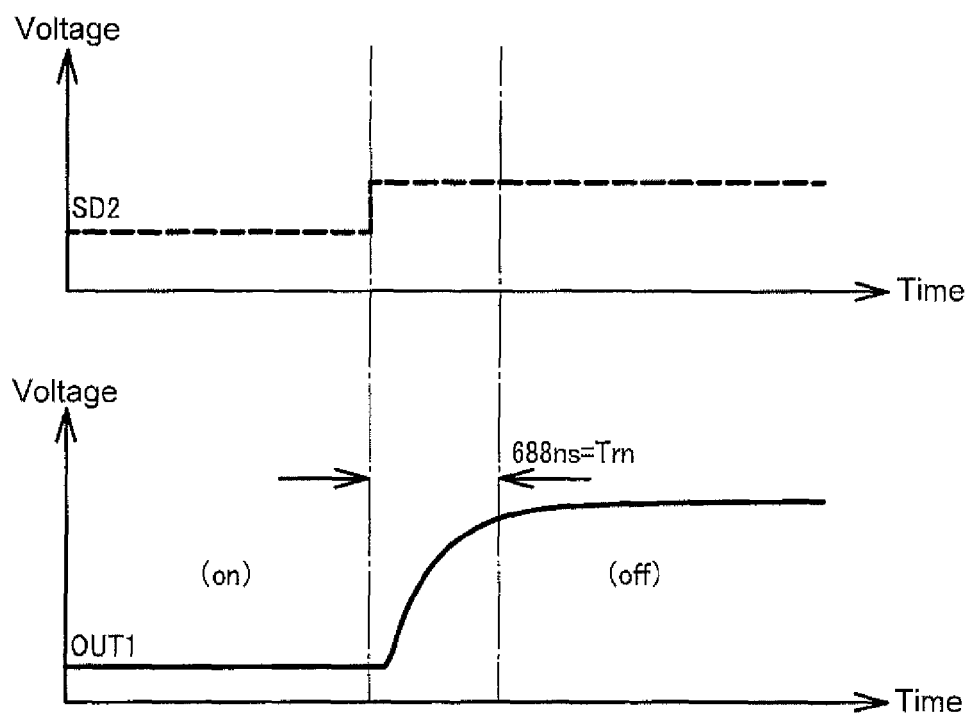
FIG. 8B shows examples of waveforms in the low-side N-type transistor.

This will be described with reference to FIGS. 7A to 8B. FIGS. 7A and 7B show examples of waveforms in the high-side P-type transistor Q1. The examples of waveforms shown in FIGS. 7A and 7B were obtained by connecting a resistive element serving as a load between the ground and the terminal OUT1, and measuring the driving pulse signal SD1 and the voltage of the terminal OUT1. FIGS. 8A and 8B show examples of waveforms in the low-side N-type transistor Q2. The examples of waveforms shown in FIGS. 8A and 8B were obtained by connecting a resistive element serving as a load between the power supply and the terminal OUT1, and measuring the driving pulse signal S22 and the voltage of the terminal OUT1. The P-type transistor Q3 and the N-type transistor Q4 also have similar waveforms.

The time (Trp) it takes from the falling edge of the driving pulse signal SD1 to the rising edge of the output of the P-type transistor Q1 (i.e., when the transistor is turned on) is 744 nanoseconds (Trp=744 ns), and the time (Tfp) it takes from the rising edge of the driving pulse signal SD1 to the falling edge of the output of the P-type transistor Q1 (i.e., when the transistor is turned off) is 688 nanoseconds (Tfp=688 ns). Also, the time (Tfn) it takes from the failing edge of the driving pulse signal SD2 to the falling edge of the output of the N-type transistor Q2 (i.e., when the transistor is turned on) is 464 nanoseconds (Tfn=464 ns), and the time (Trn) it takes from the rising edge of the driving pulse signal SD2 to the rising edge of the output of the N-type transistor Q2 (i.e., when the transistor is turned off) is 688 nanoseconds (Trn=688 ns).

The above-described rising and falling times have the following relationship: Trp>Trn, and Tfp>Tfn. In the bridge circuit 210, the on resistance of the transistors Q1 to Q4 affects the power efficiency, and it is therefore desirable to increase the transistor size and reduce the on resistance. Generally, P-type transistors have a higher on resistance than N-type transistors, and thus Trp>Trn and Tfp>Tfn.

As shown in FIG. 5, during transition from the decay period to the charge period, due to Trp>Trn, the time (Trp) it takes for the transistor Q1 to switch from off to on is longer than the time (Trn) it takes for the transistor Q2 to switch from on to off. In other words, the possibility that the transistors are turned on simultaneously is low even if the delay time is not provided. In this case, the delay time TD1 may be set to, for example, zero, or may be set to a small value just to be sure.

On the other hand, during transition from the charge period to the decay period, due to Tfp>Tfn, the time (Tfn) it takes for the transistor Q2 to switch from off to on is shorter than the time (Tfp) it takes for the transistor Q1 to switch from on to off. In other words, the possibility that the transistors are turned on simultaneously is high unless the delay time is provided. For this reason, it is necessary to set the delay time TD2 so as to be longer than the delay time TD1.

By setting the delay times TD1 and TD2 in the manner described above, it is possible to set appropriate delay times TD1 and TD2 in the bridge circuit 210 including P-type transistors as high-side transistors and N-type transistors as low-side transistors. In other words, the delay times TD1 and TD2 can be individually set in a programmable manner, and thus the minimum required dead time that can avoid through current can be achieved in the bridge circuit 210 having the above-described specific configuration.

Although the foregoing has been described by using the transistors Q1 and Q2, the same applies to the transistors Q3 and Q4. To be specific, in the delay setting register 237, third delay time information and fourth delay time information are set such that the fourth delay time TD4 used to turn the low-side N-type transistor Q4 from off to on is longer than the third delay time TD3 used to turn the high-side P-type transistor Q3 from off to on (i.e., TD4>TD3). For example, it is assumed that TD3=TD1, and TD4=TD2. The only difference between the transistors Q1 and Q2 and the transistors Q3 and Q4 is that the charge period and the decay period are replaced with each other, and thus the description given above by taking the transistors Q1 and Q2 as an example is equally applicable to the transistors Q3 and Q4.

3. Delay Circuit

Next is a detailed description of the delay circuits 251 to 254.

In the delay setting register 237, first to fourth numbers of clocks are set as the first to fourth delay time information. In other words, time periods corresponding to the first to fourth numbers of clocks are the delay times TD1 to TD4. The delay circuits 251 to 254 delay the driving pulse signals S1 to S4 used to turn the transistors Q1 to Q4 from off to on by the first to fourth numbers of clocks set in the delay setting register 237, and output the delayed driving pulse signals SD1 to SD4. The clock signals used to cause delays may be, for example, system clock signals supplied from an external host controller, or clock signals generated by a clock generation circuit provided in the circuit device 200.

With this configuration, the delay times TD1 to TD4 can be defined by the number of clocks, and thus delay times TD1 to TD4 can be consistently set, and the minimum dead time can be accurately set. Also, it is only necessary to delay the edges of the driving pulse signals S1 to S4, and thus the configuration of the delay circuits can be simplified as compared to the configuration that requires, for example, additional edges to be provided before the edges of input signals.

Figure 9:
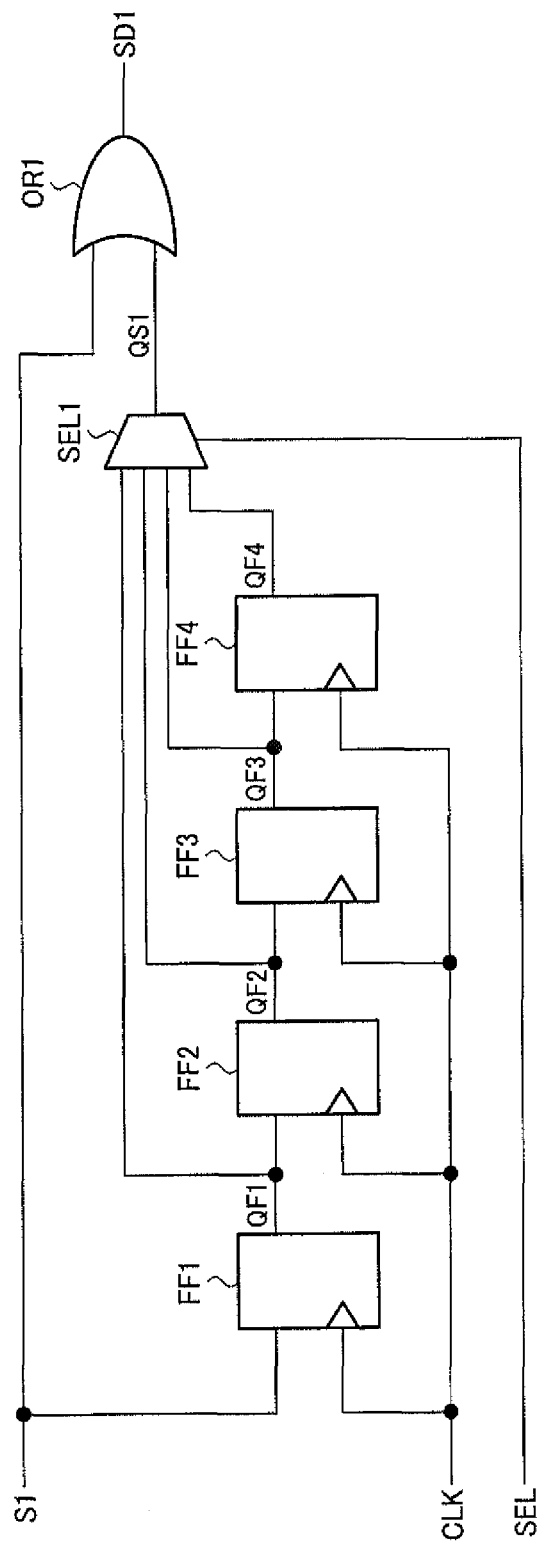
FIG. 9 shows a detailed configuration example of a delay circuit.
Figure 10:
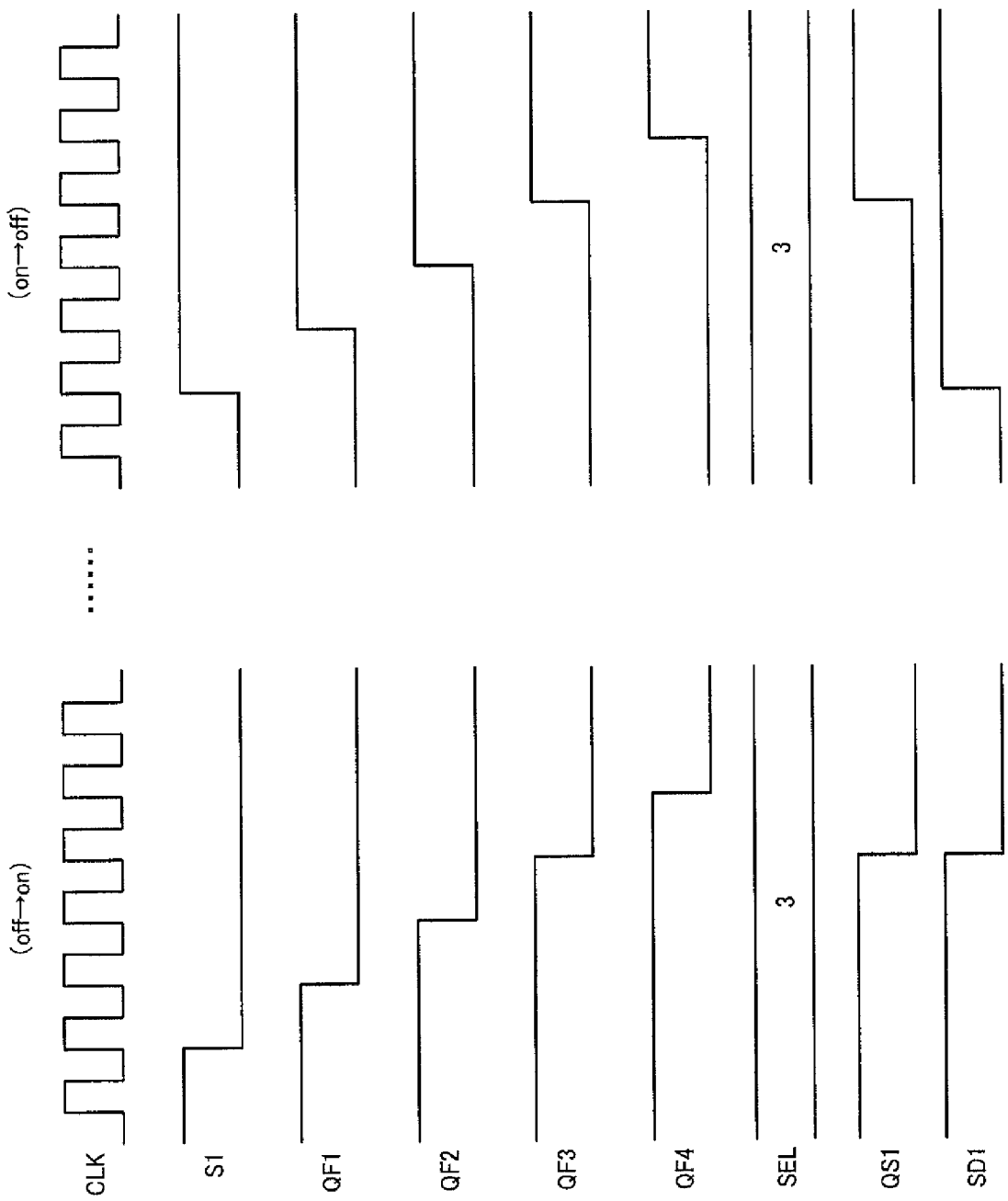
FIG. 10 shows a timing chart of the delay circuit according to the detailed configuration example.

FIG. 9 shows a detailed configuration example of the delay circuit 251. FIG. 10 shows a timing chart in the delay circuit 251 according to the detailed configuration example. The following will be described by taking the first delay circuit 251 as the i-th delay circuit (where i is a natural number less than or equal to 4), but the second to fourth delay circuits 252 to 254 can also have the same configuration.

The delay circuit 251 includes first to fourth flip-flop circuits FF1 to FF4 (first to k-th flip-flop circuits in a broad sense), a selector SEL1, and an OR circuit OR1 (logic circuit in a broad sense).

The flip-flop circuits FF1 to FF4 are cascade-connected, and a clock signal CLK is input into the flip-flop circuits FF1 to FF4. To be specific, a driving pulse signal S1 is input into the flip-flop circuit FF1. As shown in FIG. 10, the flip-flop circuit FF1 outputs a delayed pulse signal QF1 obtained by delaying the driving pulse signal S1 by one cycle (one period) of the clock signal CLK. The delayed pulse signal QF1 is input into the flip-flop circuit FF2. As shown in FIG. 10, the flip-flop circuit FF2 outputs a delayed pulse signal QF2 obtained by further delaying the delayed pulse signal QF1 by one cycle of the clock signal CLK. After that, the flip-flop circuits FF3 and FF4 are also cascade-connected in the same manner. In this way, the flip-flop circuits FF1 to FF4 output the delayed pulse signals QF1 to QF4 obtained by delaying the driving pulse signal S1 by one to four cycles, respectively.

The delayed pulse signals QF1 to QF4 and a select signal SEL are input into the selector SEL1. The select signal SEL is the first delay time information set in the delay setting register 237, and is the number of clocks corresponding to the first delay time TD1. As shown in FIG. 10, it is assumed that, for example, SEL=3 is set as the number of clocks. In this case, the selector SEL1 selects the delayed pulse signal QF3, and outputs the selected signal as a signal QS1.

The driving pulse signal S1 and the signal QS1 are input into the OR circuit OR1, and the OR circuit OR1 logically ORs these signals, and outputs the resultant as a delayed driving pulse signal SD1. At this time, the OR circuit OR1 outputs an edge of the delayed pulse signal QS1 selected by the selector SEL1 as an edge used to turn the transistor Q1 from off to on. To be specific, as shown in FIG. 10, when the driving pulse signal S1 drops from a high level to a low level, the driving pulse signal SD1 drops from a high level to a low level at the timing at which the signal QS1 drops from a high level to a low level. When, on the other hand, the driving pulse signal S1 rises from a low level to a high level, the driving pulse signal SD1 rises from a low level to a high level at the timing at which the driving pulse signal S1 rises from a low level to a high level. In this way, the falling edge of the driving pulse signal SD1 is delayed in the same manner as the signal QS1, but the rising edge of the same is not delayed.

By configuring the delay circuits 251 to 254 in the manner described above, the first to fourth driving pulse signals S1 to S4 used to turn the transistors Q1 to Q4 from off to on can be delayed by the first to fourth numbers of clocks set in the delay setting register 237. In other words, any one of the delayed pulse signals QF1 to QF4 can be selected individually for each delay circuit by the selector SEL1 according to the number of clocks. Then, only the falling edges of the selected signal QS1 can be reflected in the driving pulse signals SD1 to SD4 by the OR circuit OR1.

The above embodiment has been described by taking, as an example, the case where the driving pulse signals S1 to S4 and the driving pulse signals SD1 to SD4 are low active signals, but these signals may be high active signals. In this case, for example, the OR circuits OR1 of the delay circuits 251 to 254 are replaced by AND circuits, the pre-drivers 261 and 263 are constituted by inverse logic level shifters, and the pre-drivers 262 and 264 are constituted by non-inverse logic level shifters.

4. Detailed Configuration of Circuit Device

Figure 11:
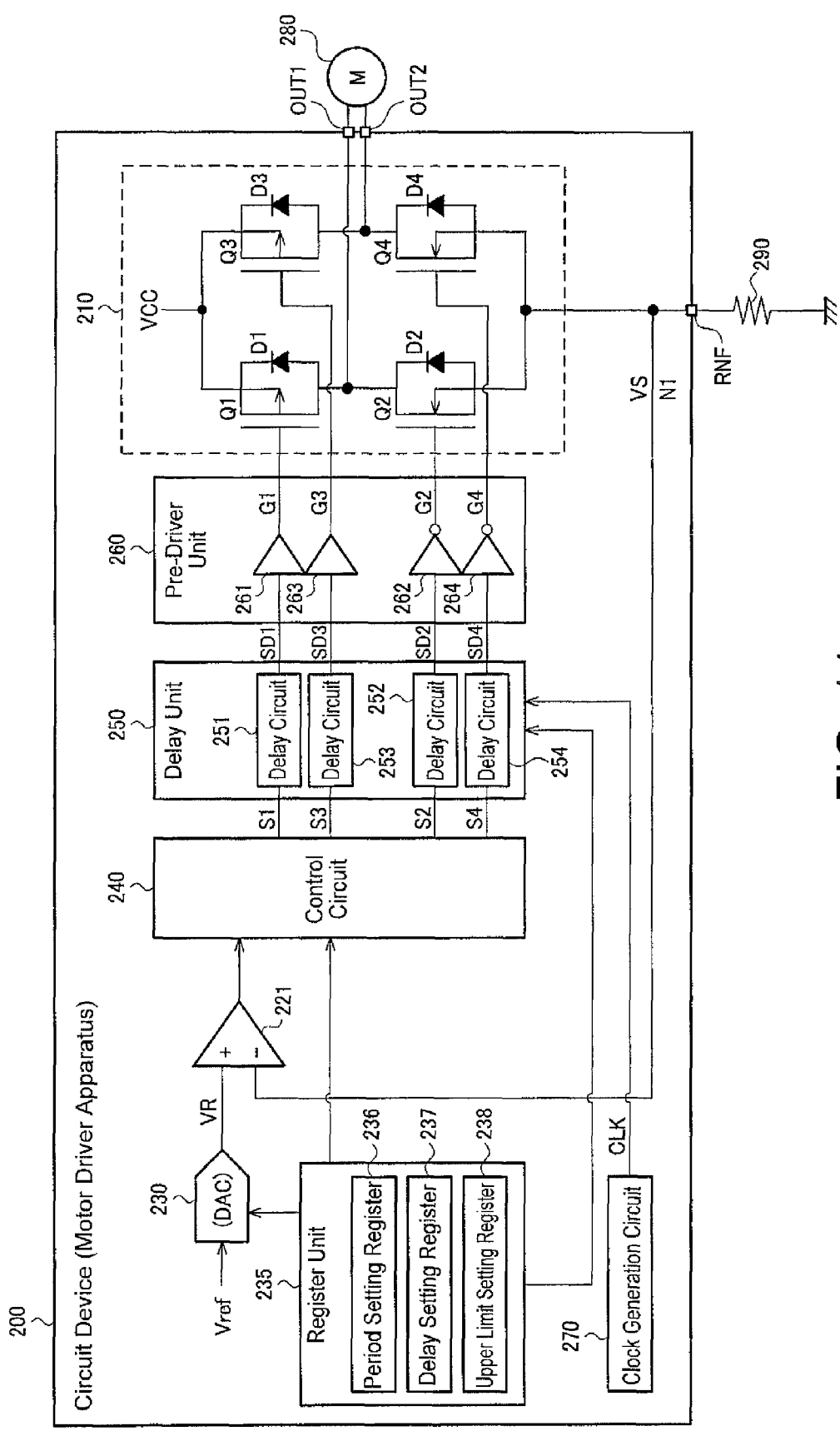
FIG. 11 shows a detailed configuration example of a circuit device.

FIG. 11 shows a detailed configuration example of the circuit device 200. FIG. 12 is a diagram illustrating an operation performed by the circuit device 200 according to the detailed configuration example.

The circuit device 200 shown in FIG. 11 includes the bridge circuit 210, a comparator 221 (detection circuit), a reference voltage generation circuit 230, the register unit 235, the control circuit 240, the delay unit 250, the pre-driver unit 260, and a clock generation circuit 270. The constituent elements that are the same as those described above are given the same reference numerals, and a description thereof is not given here.

The clock generation circuit 270 generates a clock signal CLK, and supplies the clock signal CLK to each unit of the circuit device 200. The delay circuits 251 to 254 receive the clock signal CLK, and generate delayed driving pulse signals SD1 to SD4.

In the bridge circuit 210, the source nodes of the low-side transistors Q2 and Q4 are connected to a node N1 that is connected to a terminal RNF. One end of a sense resistor 290 is connected to the terminal RNF. The other end of the sense resistor 290 is connected to the node of the ground voltage.

The register unit 235 includes the aforementioned delay setting register 237, a period setting register 236 in which the length of the decay period is set, and an upper limit setting register 238 in which the upper limit of the charge current (driving current Id) is set. A register value is variably written in the register unit 235 by, for example, a host controller (for example, CPU), and thereby the host controller controls the number of revolutions, torque and the like of the motor 280.

The reference voltage generation circuit 230 generates a reference voltage VR for detecting the upper limit Imax of the charge current. To be specific, the reference voltage generation circuit 230 is constituted by a D/A conversion circuit. The D/A conversion circuit generates a plurality of voltages based on a reference voltage Vref, selects a voltage corresponding to the register value set in the upper limit setting register 238 from among the plurality of voltages, and outputs the selected voltage as the reference voltage VR.

The comparator 221 detects the charge current during the charge period by detecting a voltage VS of the node N1. As shown in FIG. 3, the driving current Id flows from the power supply voltage VCC to the transistor Q1, the motor 280 and the transistor Q4. In the configuration example shown in FIG. 11, the driving current Id further flows through the sense resistor 290 to the ground voltage. The driving current Id during this charge period is called "charge current". As shown in FIG. 12, during a charge period TC, the charge current increases, and the voltage VS of the node N1 rises along with the increase of the charge current. The comparator 221 detects that the charge current has reached the upper limit Imax by detecting that the voltage VS has reached the reference voltage VR.

The control circuit 240 switches from the charge period TC to a decay period TD if the comparator 221 detects the upper limit Imax of the charge current during the charge period TC. The driving current Id during the decay period TD is called "decay current", and as shown in FIG. 12, the decay current decreases during the decay period TD. After the decay period set in the period setting register 236 elapses after switching to the decay period TD by the control circuit 240, the control circuit 240 switches from the decay period ID to the charge period TC. In this way, the charge period TC and the decay period TD are repeated, and the driving current Id of the motor 280 is controlled such that the upper limit does not exceed Imax.

5. Electronic Device

Figure 13:
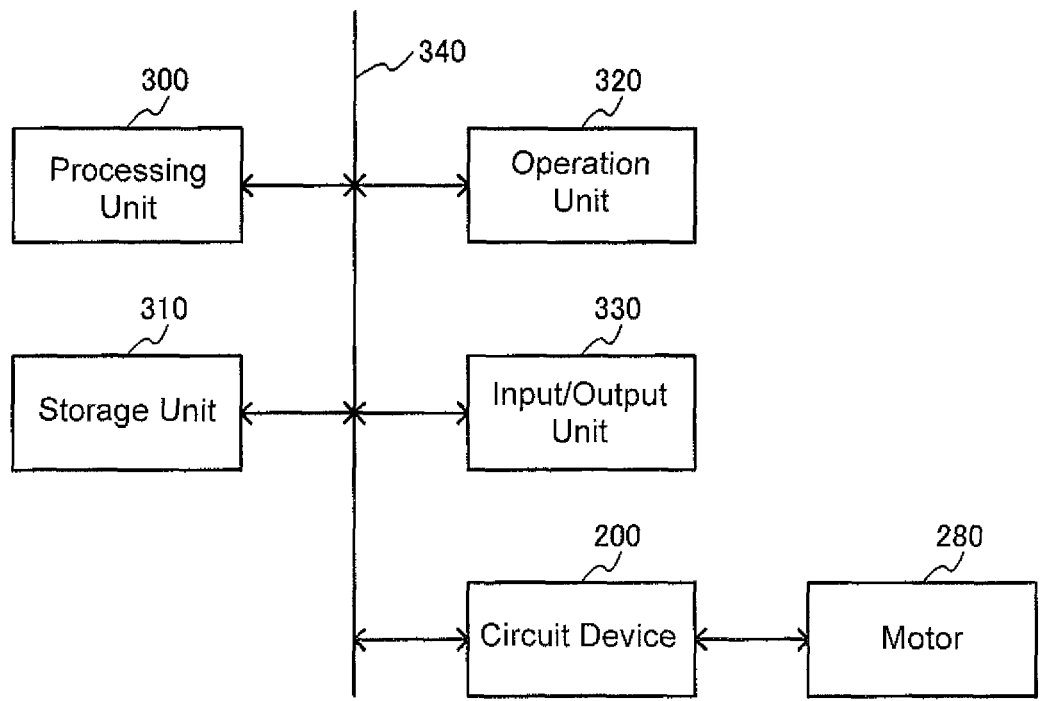
FIG. 13 is an example of a configuration of an electronic device.

FIG. 13 shows an example of a configuration of an electronic device in which the circuit device 200 of the present embodiment is used. The electronic device includes a processing unit 300, a storage unit 310, an operation unit 320, an input/output unit 330, the circuit device 200, a bus 340 that connects these units, and the motor 280. The circuit device 200 can be implemented by, for example, an integrated circuit device. The following will be described using, as an example, a printer in which its head and paper feed are controlled by motor driving, but the present embodiment is not limited thereto, and is applicable to any type of electronic devices.

The input/output unit 330 can be, for example, a USE connector, or an interface such as a wireless LAN, and receives input of image data and document data. The input data is stored in the storage unit 310, which is, for example, an internal storage device such as a DRAM. Upon receiving a print instruction via the operation unit 320, the processing unit 300 starts an operation to print the data stored in the storage unit 310. The processing unit 300 sends an instruction according to the print layout of the data to the circuit device 200, and the circuit device 200 rotates the motor 280 based on the instruction so as to move the head or feed paper.

While the present embodiment has been described in detail above, it will be readily understood by those skilled in the art that numerous modifications are possible without substantially departing from the novel features and advantageous effects of the invention. Accordingly, all such modifications also fall within the scope of the invention. For example, a term used with a broader or similar but different term at least once in the specification or the drawings can be replaced by the different term in anywhere in the specification or the drawings. All combinations of the present embodiment and variations also fall within the scope of the invention. Also, the configurations and operations of the delay circuits, the bridge circuit, the circuit device and the electronic device, the method for setting the delay times, the method for controlling the bridge circuit, and the like are not limited to those described in the present embodiment, and various other modifications are possible.

The entire disclosure of Japanese Patent Application No. 2013-208887, filed Oct. 4, 2013 is expressly incorporated by reference herein.

What is claimed is:

1. A circuit device comprising:
a bridge circuit including first to n-th transistors, n being a natural number of 2 or greater;
a control circuit that outputs first to n-th driving pulse signals for controlling the first to n-th transistors between on and off;
first to n-th delay circuits that delay the first to n-th driving pulse signals;
first to n-th pre-drivers that drive the first to n-th transistors based on the delayed first to n-th driving pulse signals; and
a delay setting register in which first to n-th delay time information are variably set, wherein
the first to n-th delay circuits delay the first to n-th driving pulse signals used to turn the first to n-th transistors from off to on by first to n-th delay times corresponding to the first to n-th delay time information,
a first transistor among the first to n-th transistors is a high-side P-type transistor,
a second transistor among the first to n-th transistors is a low-side N-type transistor whose drain node is connected to a drain node of the high-side P-type transistor, and
in the delay setting register, the first delay time information and the second delay time information are set such that the second delay time used to turn the low-side N-type transistor from off to on is longer than the first delay time used to turn the high-side P-type transistor from off to on.

2. The circuit device according to claim 1,
wherein a third transistor among the first to n-th transistors is a second high-side P-type transistor,
a fourth transistor among the first to n-th transistors is a second low-side N-type transistor whose drain node is connected to a drain of the second high-side P-type transistor, and
in the delay setting register, the third delay time information and the fourth delay time information are set such that the fourth delay time used to turn the second low-side N-type transistor from off to on is longer than the third delay time used to turn the second high-side P-type transistor from off to on.

3. A circuit device comprising:
a bridge circuit including first to n-th transistors, n being a natural number of 2 or greater;
a control circuit that outputs first to n-th driving pulse signals for controlling the first to n-th transistors between on and off;
first to n-th delay circuits that delay the first to n-th driving pulse signals;
first to n-th pre-drivers that drive the first to n-th transistors based on the delayed first to n-th driving pulse signals; and
a delay setting register in which first to n-th delay time information are variably set, wherein
the first to n-th delay circuits delay the first to n-th driving pulse signals used to turn the first to n-th transistors from off to on by first to n-th delay times corresponding to the first to n-th delay time information
in the delay setting register, first to n-th numbers of clocks are set as the first to n-th delay time information, and
the first to n-th delay circuits delay the first to n-th driving pulse signals used to turn the first to n-th transistors from off to on by the first to n-th numbers of clocks.

4. The circuit device according to claim 3,
wherein an i-th delay circuit (where i is a natural number less than or equal to n) among the first to n-th delay circuits includes:
cascade-connected first to k-th flip-flop circuits that output first to k-th delayed pulse signals that are obtained by delaying an i-th driving pulse signal among the first to n-th driving pulse signals by one to k clocks, respectively, k being a natural number greater than or equal to 2;

a selector that selects, from among the first to k-th delayed pulse signals, a delayed pulse signal corresponding to i-th delay time information among the first to n-th delay time information; and a logic circuit that outputs an edge of the delayed pulse signal selected by the selector as an edge used to turn an i-th transistor among the first to n-th transistors from off to on.

5. The circuit device according to claim 4, wherein first and second transistors among the first to n-th transistors are high-side P-type transistors, third and fourth transistors among the first to n-th transistors are low-side N-type transistors, first and second pre-drivers among the first to n-th pre-drivers are level shifters that output input signals by using a non-inverse logic, and third and fourth pre-drivers among the first to n-th pre-drivers are level shifters that output input signals by using an inverse logic.

6. A circuit device comprising:

a bridge circuit including a first transistor and a second transistor;

a control circuit that outputs a first driving pulse for controlling the first transistor and a second driving pulse for controlling the second transistor;

a first delay circuit that delays the first driving pulse; and a second delay circuit that delays the second driving pulse, wherein the first transistor is a high-side P-type transistor, the second transistor is a low-side N-type transistor, the first delay circuit delays the first driving pulse used to turn the first transistor from off to on by a first delay time, and the second delay circuit delays the second driving pulse used to turn the second transistor from off to on by a second delay time that is longer than the first delay time.

* * * * *